United States Patent
Nakamura et al.

(10) Patent No.: US 9,689,419 B2
(45) Date of Patent: Jun. 27, 2017

(54) TEMPORARY ATTACHMENT AND A HOLDER FOR A MEMBER TO BE HELD

(71) Applicants: TOYOTA JIDOSHA KABUSHIKI KAISHA, Toyota-shi, Aichi (JP); NEWFREY LLC., Newark, DE (US)

(72) Inventors: Shuji Nakamura, Toyota (JP); Hiroto Matsuno, Toyohashi (JP)

(73) Assignees: TOYOTA JIDOSHA KABUSHIKI KAISHA, Toyota (JP); NEWFREY LLC, Newark, DE (US)

(*) Notice: Subject to any disclaimer, the term of this patent is extended or adjusted under 35 U.S.C. 154(b) by 0 days.

(21) Appl. No.: 14/970,060

(22) Filed: Dec. 15, 2015

(65) Prior Publication Data
US 2016/0178116 A1  Jun. 23, 2016

(30) Foreign Application Priority Data
Dec. 18, 2014 (JP) .................. 2014-256017

(51) Int. Cl.
  *F16B 37/08* (2006.01)
  *F16B 33/02* (2006.01)
  (Continued)

(52) U.S. Cl.
  CPC ............... *F16B 33/02* (2013.01); *B60T 7/06* (2013.01); *F16B 37/0842* (2013.01);
  (Continued)

(58) Field of Classification Search
  CPC ....... F16B 13/08; F16B 2/065; F16B 37/0857
  (Continued)

(56) References Cited

U.S. PATENT DOCUMENTS 2,400,545 A * 5/1946 Kost ............... F16B 37/02
                                                    411/437
2,901,938 A * 9/1959 Van Buren, Jr. ....... B21D 53/28
                                                    411/437
(Continued)

FOREIGN PATENT DOCUMENTS

JP    H01-89614 U    6/1989
JP    2009-180234 A  8/2009
(Continued)

*Primary Examiner* — Kimberly Wood
(74) *Attorney, Agent, or Firm* — Oliff PLC

(57) ABSTRACT

A threaded portion with thread groove formed and non-threaded portion without the thread groove are prepared on rod-like portion of stud, and non-threaded diameter-increasing portion whose outer diameter is increasing toward thread ridge of screw portion with thread groove formed and non-threaded small diameter portion connecting to small diameter region of non-threaded diameter-increasing portion and having same diameter as that of small diameter region are prepared at threaded portion side edge of non-threaded portion. A holder is provided with stud-receiving hole which receives the rod-like portion, a first locking portion and a second locking portion. The second locking portion is engaged with the non-threaded small diameter portion in a fixedly holding status, and the second locking portion is engaged with the non-threaded diameter-increasing portion in a status that the holder is moved for a predetermined amount in a direction away from the fixedly holding status.

2 Claims, 4 Drawing Sheets

(51) Int. Cl.
*B60T 7/06* (2006.01)
*F16B 41/00* (2006.01)
*G05G 1/36* (2008.04)

(52) U.S. Cl.
CPC ........ F16B 37/0857 (2013.01); F16B 41/002 (2013.01); *G05G 1/36* (2013.01)

(58) Field of Classification Search
USPC .................. 411/433, 437; 248/534, 68.1, 73
See application file for complete search history.

(56) References Cited

U.S. PATENT DOCUMENTS

| | | | | |
|---|---|---|---|---|
| 2,969,705 A * | 1/1961 | Becker | ..................... | F16B 37/02 411/437 |
| 3,052,130 A * | 9/1962 | Kellogg | ..................... | B60T 7/04 188/2 R |
| 3,194,107 A * | 7/1965 | Baliard | .................. | F16B 37/02 29/509 |
| 4,435,111 A * | 3/1984 | Mizusawa | ........... | F16B 37/0842 411/21 |
| 4,512,698 A * | 4/1985 | Muad | ....................... | A63C 9/00 411/337 |
| 4,570,303 A * | 2/1986 | Richmond | ............ | F16B 21/071 24/16 PB |
| 4,571,136 A * | 2/1986 | Peek | ...................... | B60N 3/046 24/104 |
| 4,728,236 A * | 3/1988 | Kraus | ................. | F16B 37/0842 24/662 |
| 4,756,654 A * | 7/1988 | Clough | ............... | F16B 37/0842 411/429 |
| 4,762,450 A * | 8/1988 | Schwind | ............... | F16B 13/061 411/187 |
| 4,842,437 A * | 6/1989 | Egner | ................. | F16B 37/002 29/432.1 |
| 4,850,778 A * | 7/1989 | Clough | ............... | F16B 37/0842 411/182 |
| 5,098,242 A * | 3/1992 | Schaty | ................ | F16B 37/0842 411/339 |
| 5,139,380 A * | 8/1992 | Reynolds | ............... | B21D 53/24 411/437 |
| 5,154,376 A * | 10/1992 | Baum | .................... | F16L 3/2332 24/16 PB |
| 5,291,639 A * | 3/1994 | Baum | ..................... | F16B 5/128 24/289 |
| 5,423,647 A * | 6/1995 | Suzuki | ................ | B60R 16/0215 411/433 |
| 5,636,956 A * | 6/1997 | Emmett | ................... | F16B 33/02 411/360 |
| 5,639,196 A * | 6/1997 | Murase | .................. | B62D 43/10 411/349 |
| 5,660,513 A * | 8/1997 | Shibanushi | ......... | F16B 37/0842 411/433 |
| 5,816,762 A * | 10/1998 | Miura | ................. | F16B 37/0842 411/433 |
| 5,906,464 A * | 5/1999 | Wedenig | .............. | F16B 37/0842 411/433 |
| 6,070,836 A * | 6/2000 | Battie | ..................... | F16L 3/223 248/68.1 |
| 6,338,602 B1 * | 1/2002 | Gombert | ............ | F16B 21/073 411/339 |
| 6,571,436 B2 * | 6/2003 | Gombert | ................ | F16B 21/07 24/656 |
| 7,059,022 B2 * | 6/2006 | Yuta | ....................... | B60R 13/011 24/297 |
| 7,114,901 B2 * | 10/2006 | Maruyama | ............ | F16B 5/0208 24/293 |
| 7,182,563 B2 * | 2/2007 | Wimmer | ............... | F16B 37/041 411/174 |
| 7,320,571 B2 * | 1/2008 | Kanie | ................. | F16B 5/0685 411/433 |
| 7,322,784 B2 * | 1/2008 | Castro | ................ | F16B 37/0842 411/433 |
| 7,651,057 B2 * | 1/2010 | Sedivy | ..................... | F16L 3/237 248/68.1 |
| 7,891,151 B2 * | 2/2011 | Sano | ................... | B62D 25/2072 296/97.23 |
| 7,967,272 B2 * | 6/2011 | Nilsen | ..................... | E04B 9/006 248/214 |
| 8,328,488 B2 * | 12/2012 | Luk | ...................... | F16B 5/0685 248/68.1 |
| 8,371,788 B2 * | 2/2013 | Lange | ..................... | F16B 5/065 411/112 |
| 8,899,894 B2 * | 12/2014 | Limpert | ........................ | 411/108 |
| 8,950,993 B2 * | 2/2015 | Gagne | .................... | F16B 37/08 411/433 |
| 9,039,339 B2 * | 5/2015 | Kuhm | ....................... | F16B 37/08 411/437 |
| 9,284,967 B2 * | 3/2016 | Iwahara | .................. | F16B 2/065 |
| 2003/0147720 A1 * | 8/2003 | Kovac | ................. | F16B 37/0842 411/433 |
| 2004/0141828 A1 * | 7/2004 | Kanie | ....................... | F16L 3/223 411/437 |
| 2004/0141829 A1 * | 7/2004 | Maruyama | ........... | F16B 5/0208 411/437 |
| 2006/0034671 A1 * | 2/2006 | Castro | ................. | F16B 37/0842 411/437 |
| 2010/0278615 A1 * | 11/2010 | Gerlach | .............. | B29C 45/2622 411/437 |

FOREIGN PATENT DOCUMENTS

| | | |
|---|---|---|
| JP | 2009-185902 A | 8/2009 |
| JP | 2012-167716 A | 9/2012 |
| JP | 2013-139631 A | 7/2013 |

* cited by examiner

TEMPORARY ATTACHMENT AND A HOLDER FOR A MEMBER TO BE HELD

TECHNICAL FIELD

The present invention relates to a temporary attachment which comprises a stud that consists of a rod-like portion and a head integrally prepared on the base side of this rod-like portion and a holder that is assembled with said rod-like portion of this stud and holds a member to be held (for instance, a member such as a bracket) in conjunction with said stud, and said holder in this temporary attachment.

BACKGROUND ART

The temporary attachment of the above-mentioned member to be held is used, for instance, when temporarily attaching an appropriate (member to be held) in an assembly of a vehicle, and a holder configured so as to increase its holding force to a stud is described in the following Patent Document 1 (PTL1), for example.

CITATION LIST

Patent Literature

[PTL1] Japanese Patent Application Laid-Open (kokai) No. 2009-185902

SUMMARY OF INVENTION

The holder described in the above-mentioned Patent Document 1 is provided with a lot (two pairs, four) of stud locking portions having a nail portion for fitting into a thread groove formed on a stud and is elastically engaged with a rod-like portion of the stud and thereby its holding force is increased. In such a holder, since all the nail portions of each stud locking portion are fitting into the thread grooves of the stud, a force for preventing the holder from loosening when expected engaging force with the stud is acquired at the nail portion of each stud locking part. However, when the engaging force of each stud locking portion with the stud decreases due to creep deterioration of each stud locking portion etc., the holder will come to rotate with respect to the thread groove on the stud, and there is a possibility that the holder may be separated (detached) from the stud.

The present invention has been made in order to cope with the above-mentioned problems (prevent the holder from being separated from the stud), and is a temporary attachment for a member to be held, which comprises:

a stud that consists of a rod-like portion and a head integrally prepared on the base side of this rod-like portion, in which a threaded portion with a thread groove formed on its outer periphery surface is prepared on the tip side of said rod-like portion, and a non-threaded portion without said thread groove is prepared on the base side of said rod-like portion, a non-threaded diameter-increasing portion whose outer diameter is increasing toward the thread ridge formed on said threaded portion is prepared at the threaded portion side edge of said non-threaded portion, and a non-threaded small diameter portion connecting to a small diameter region being a region in this non-threaded diameter-increasing portion with the smallest diameter and having the same diameter as that of the small diameter region, and a holder that is assembled with said rod-like portion of this stud and holds (temporarily attaches) said member to be held in conjunction with said stud, and characterized in that:

said holder is provided with a stud-receiving hole which receives said rod-like portion, a first locking portion which has a nail portion for fitting into said thread groove, and a second locking portion which has a nail portion for engaging with said non-thread portion of said rod-like portion, and said first locking portion can be elastically engaged with said threaded portion and said second locking portion can be elastically engaged with said non-threaded portion when said rod-like portion is received in said stud-receiving hole, and said holder is configured so that said first locking portion is engaged with said threaded portion and said second locking portion is engaged with said non-threaded small diameter portion in a fixedly holding status that said member to be held is fixedly held with said stud and said holder, and said first locking portion is engaged with said threaded portion and said second locking portion is engaged with said non-threaded diameter-increasing portion in a status that said holder is moved for a predetermined amount in a direction away from said fixedly holding status.

Moreover, the present invention has been made in order to cope with the above-mentioned problems, and is a holder which is assembled with a rod-like portion of a stud that consists of a rod-like portion and a head integrally prepared on the base side of this rod-like portion, in which a threaded portion with a thread groove formed on its outer periphery surface is prepared on the tip side of said rod-like portion, and a non-threaded portion without said thread groove is prepared on the base side of said rod-like portion, a non-threaded diameter-increasing portion whose outer diameter is increasing toward the thread ridge formed on said threaded portion is prepared at the threaded portion side edge of said non-threaded portion, and a non-threaded small diameter portion connecting to a small diameter region being a region in this non-threaded diameter-increasing portion with the smallest diameter and having the same diameter as that of the small diameter region, and holds a member to be held in conjunction with said stud, and characterized in that:

said holder is provided with a stud-receiving hole which receives said rod-like portion, a first locking portion which has a nail portion for fitting into said thread groove, and a second locking portion which has a nail portion for engaging with said non-thread portion of said rod-like portion, and said first locking portion can be elastically engaged with said threaded portion and said second locking portion can be elastically engaged with said non-threaded portion when said rod-like portion is received in said stud-receiving hole, and said holder is configured so that said first locking portion is engaged with said threaded portion and said second locking portion is engaged with said non-threaded small diameter portion in a fixedly holding status that said member to be held is fixedly held with said stud and said holder, and said first locking portion is engaged with said threaded portion and said second locking portion is engaged with said non-threaded diameter-increasing portion in a status that said holder is moved for a predetermined amount in a direction away from said fixedly holding status.

In the "temporary attachment for a member to be held" and the "holder" according to the present invention, even when the engaging force of the first stud locking portion with the thread groove formed on the rod-like portion of the stud decreases due to creep deterioration of the first stud locking portion prepared in the holder etc. and thereby the holder rotates in a direction in which the holder is detached from the stud, said second locking portion in the holder comes to be engaged with (run upon) the non-threaded diameter-increasing portion from the non-threaded small diameter portion, while the first locking portion in the holder is engaged with the thread groove of the stud, in a status that the holder is moved for a predetermined amount in a direction away from the fixedly holding status. In this case, the second locking portion runs from the non-threaded small diameter portion upon the non-threaded diameter-increasing portion and thereby the engaging force of the second locking portion with the rod-like portion of the stud increases, and the engaging force (rotation restriction force) of the holder (the first locking portion and the second locking portion) with the stud (rod-like portion) increases. For this reason, thereafter, the rotation of the holder with respect to the stud is suppressed, the holder is prevented from loosening, and the secession of the holder from the stud is prevented.

DESCRIPTION OF EMBODIMENTS

Figure 1:
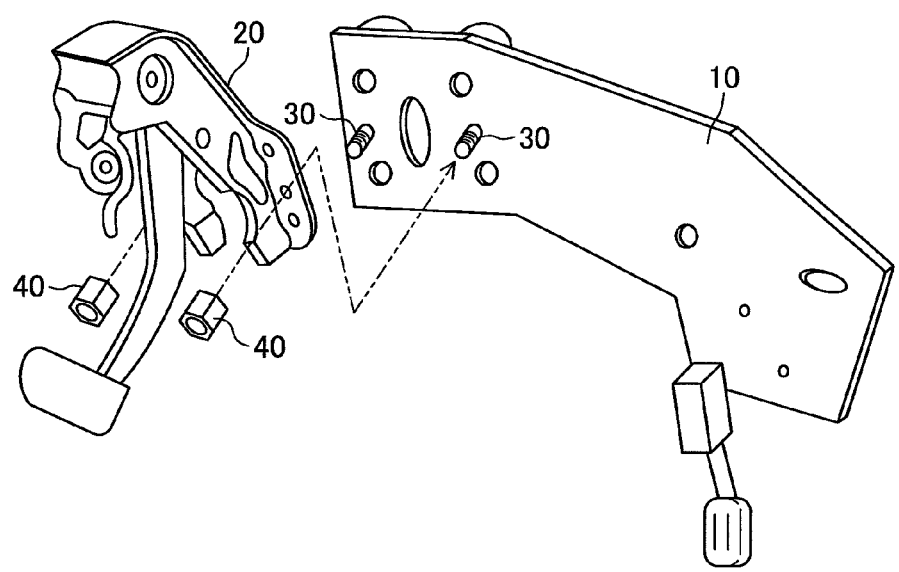
FIG. 1 is a perspective view for schematically showing one embodiment wherein the "temporary attachment for a member to be held" according to the present invention is used on assembling a vehicle.

Hereafter, embodiments of the present invention will be explained based on drawings. FIG. 1 to FIG. 6 show one embodiment of the present invention schematically. In this embodiment, the "temporary attachment for a member to be held" comprising the stud 30 and the holder 40 is used when the brake pedal bracket 20 (member to be held) is temporarily attached to the module bracket 10 (base) for fixing a brake pedal unit, on assembling a vehicle. In addition, the module bracket 10 is configured so as to be fixed to a vehicle body.

The stud 30 has the rod-like portion 31 and the head 32 integrally prepared in the base portion (lower region in the drawings) of the rod-like portion 31. The stud 30 has been integrally fixed to the module bracket 10 by welding at the head 32. The rod-like portion 31 consists of the threaded portion 31A and the non-threaded portion 31B. The threaded portion 31A is formed on the tip side (upper side in the drawings) of the rod-like portion 31 and has a predetermined diameter, and the thread groove 31a1 with a predetermined pitch is formed on its outer periphery surface.

The non-threaded portion 31B is constituted by the non-threaded large diameter portion 31b1, the non-threaded small diameter portion 31b2 and the non-threaded diameter-increasing portion 31b3 formed in the order from the base side (lower side in the drawings) toward the tip side of the rod-like portion 31. The non-threaded large diameter portion 31b1 has a shape of a cylinder with the approximately same diameter as that of the threaded portion 31A. The non-threaded small diameter portion 31b2 is formed to be connected to the small diameter region with the smallest diameter of the non-threaded diameter-increasing portion 31b3, and has a shape of a cylinder with the same diameter as that of the small diameter region. The non-threaded diameter-increasing portion 31b3 has a shape of a circular truncated cone whose outer diameter expands towards the thread ridge 31a2 of the screw portion 31a (threaded portion 31A) on which the thread groove 31a1 is formed.

The above-mentioned stud 30 is manufactured by processing the thread groove 31a1 into a portion of the rod-like portion 31 (threaded portion 31A) in a material status formed in a predetermined shape.

The holder 40 is made of a resin, and while the stud-receiving hole 41, the first locking portion 42, and the second locking portion 43 are prepared, the stopper piece 44 and the stopper protrusion 45 are prepared. The stud-receiving hole 41 is prepared in the axial center portion of the holder 40, opens at its lower side in the drawings, and is configured to be able to receive the rod-like portion 31 of the stud 30.

Figure 2:
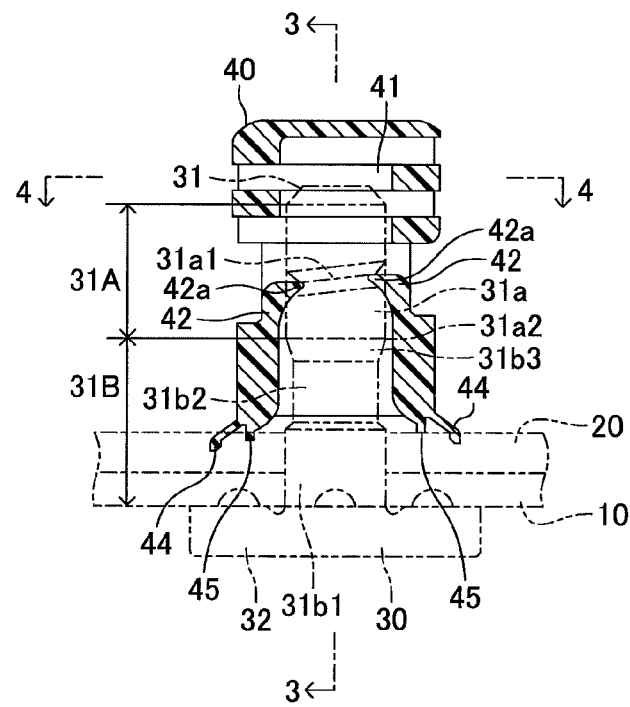
FIG. 2 is a vertical sectional view for schematically showing a status (fixedly holding status) that a holder is attached to the stud of the "temporary attachment for a member to be held" according to the present invention and the member to be held is fixedly held.
Figure 4:
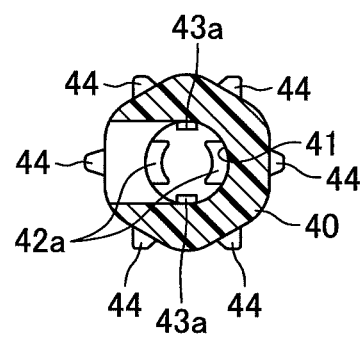
FIG. 4 is a sectional view along the 4-4 line in FIG. 2.
Figure 5:
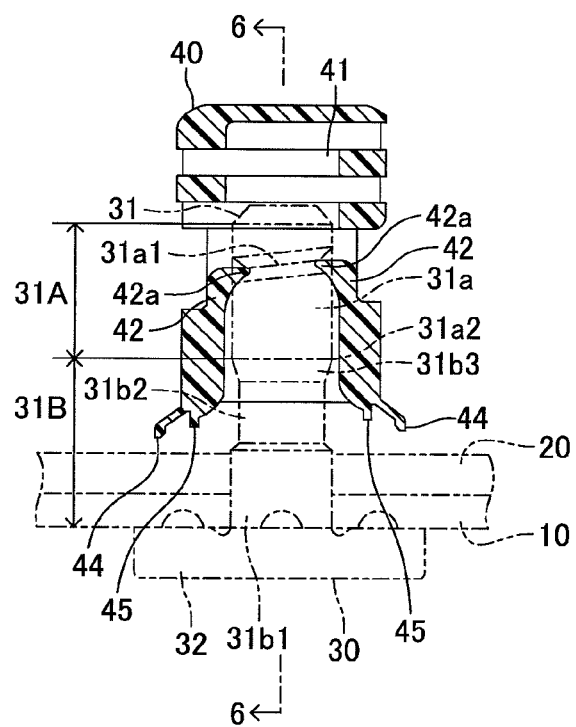
FIG. 5 is a vertical sectional view for schematically showing a status (loosely holding status) that the holder has been moved for a predetermined amount in a direction away from the fixedly holding status in the embodiments shown in FIG. 2 and FIG. 3.

A left-and-right pair of the first locking portions 42 is prepared in FIG. 2, FIG. 4 and FIG. 5, has a nail portion 42a for fitting into the thread groove 31a1 of the stud 30, and is elastically engaged with the rod-like portion 31. In addition, according to the pitch of the thread groove 31a1, the heights (dispositions) of the nail portions 42a on right and left in the drawings are shifted mutually half a pitch.

Figure 3:
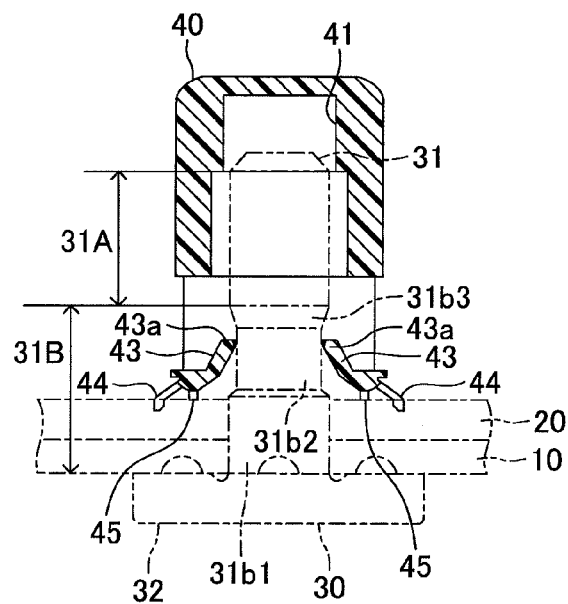
FIG. 3 is a sectional view along the 3-3 line in FIG. 2.
Figure 6:
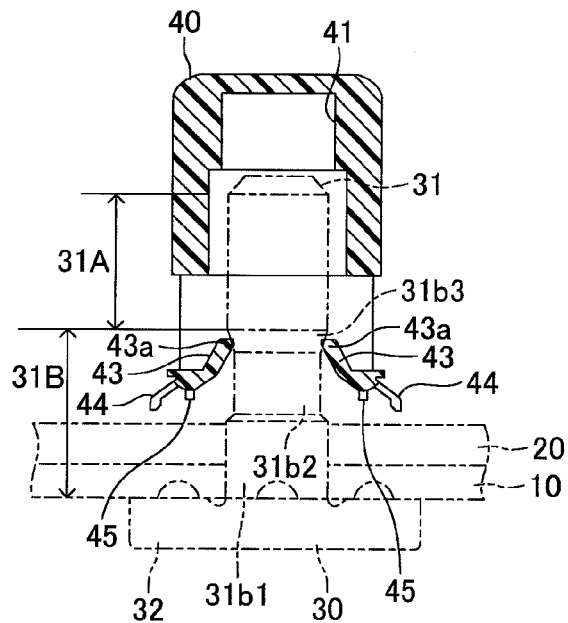
FIG. 6 is a sectional view along the 6-6 line in FIG. 5.

A left-and-right pair (an up-and-down pair in FIG. 4) of the second locking portion 43 is prepared in FIG. 3 and FIG. 6, has the nail portion 43a which engages with the non-threaded portion 31B of the rod-like portion 31, and is elastically engaged with the rod-like portion 31. It is set that the heights (dispositions) of the nail portions 43a on right and left in the drawings are identical, each nail portion 43a is engaged with the non-threaded small diameter portion 31b2 in the state of FIG. 3 (fixedly holding status that the member to be held 20 is fixedly held with the stud 30 and the holder 40), and each nail portion 43a is engaged with (runs upon) the non-threaded diameter-increasing portion 31b3 in the state of FIG. 6 (status that the holder 40 has been moved for a predetermined amount in a direction away from the fixedly holding status).

When the holder 40 is fitted with the rod-like portion 31 of the stud 30 and it will be in the fixedly holding status of FIG. 2 and FIG. 3, the stopper piece 44 and the stopper protrusion 45 come into contact with the brake pedal bracket 20 to function, and six of them are formed to be equally spaced in a circumferential direction, respectively. In addition, each stopper piece 44 has a function which buffers the collision with the brake pedal bracket 20. Moreover, each stopper protrusion 45 has a function to define the maximum amount of fitting of the holder 40 with the rod-like portion 31.

In the above-mentioned embodiment, as shown in FIG. 1 and FIG. 2 on assembling a vehicle, the holder 40 is fitted with the rod-like portion 31 of the stud 30, and the brake pedal bracket 20 (member to be held) is temporarily attached to the module bracket 10 (basis). In addition, the holder 40 will not be detached, even after the module bracket 10 and the brake pedal bracket 20 are finally attached and fixed to a vehicle body.

By the way, in this embodiment, even if the engaging force of the first locking portion 42 with the thread groove 31a1 formed in the rod-like portion 31 of the stud 30 decreases and the holder 40 rotates in a direction in which the holder 40 is detached from the stud 30 from the status of FIG. 2 and FIG. 3, in a status that the holder is moved for a predetermined amount in a direction away from the fixedly holding status, as shown in FIG. 5 and FIG. 6, the second locking portion 43 in the holder 40 comes to be engaged with (run upon) the non-threaded diameter-increasing portion 31b3 from the non-threaded small diameter portion, while the first locking portion 42 in the holder 40 is engaged with the threaded groove 31a1 of the stud 30.

In this case, the second locking portion 43 runs from the non-threaded small diameter portion 31b2 upon the non-threaded diameter-increasing portion 31b3 and thereby the engaging force of the second locking portion 43 to the rod-like portion 31 of the stud 30 increases, and the engaging force (rotation restriction force) of the holder 40 (the first locking portion 42 and the second locking portion 43) with the stud 30 (rod-like portion 31) increases. For this reason, thereafter, the rotation of the holder 40 with respect to the stud 30 is suppressed, the holder 40 is prevented from loosening, and the secession of the holder 40 from the stud 30 is prevented Moreover, in accordance with this embodiment, in a stud material formed into a predetermined shape, the suppression of the rotation of the holder 40 with respect to the stud 30 can be carried out inexpensively by the engaging force acquired by elastically engaging the second locking portion 43 with the simple non-threaded portion 31B of the stud 30 manufactured by processing the thread groove 31a1 into a portion (threaded portion 31A) of the rod-like portion 31 in a material status.

Although a pair of the first locking portions 42 and a pair of the second locking portions 43 were formed respectively for carrying out the present invention in the above-mentioned embodiment, the numbers of the first locking portions 42 and the second locking portions 43 can be properly increased or decreased and are not limited to the above-mentioned number, on carrying out the present invention.

REFERENCE SIGNS LIST

10: Module Bracket (Base), 20: Brake Pedal Bracket (Member To Be Held), 30: Stud, 31: Rod-Like Portion, 31A: Threaded Portion, 31a: Screw Portion, 31a1: Thread groove, 31a2: Thread Ridge, 31B: Non-Threaded Portion, 31b1: Non-Threaded Large Diameter Portion, 31b2: Non-Threaded Small Diameter Portion, 31b3: Non-Threaded Diameter-Increasing Portion, 32: Head, 40: Holder, 41: Stud-receiving hole, 42: First Locking Portion, 42a: Nail Portion, 43: Second Locking Portion, and 43a: Nail Portion.

The invention claimed is:

1. A temporary attachment for a member to be held, said temporary attachment comprising:
a stud that has a rod portion and a head integrally disposed on a base side of said rod portion, said rod portion including:
a threaded portion that has a thread groove on an outer periphery surface of said threaded portion and a thread ridge, said threaded portion being disposed on a tip side of said rod portion, and
a non-threaded portion without said thread groove, said non-threaded portion being disposed on said base side of said rod portion, said non-threaded portion including:
a non-threaded diameter-increasing portion that has an outer diameter increasing toward said thread ridge, said non-threaded diameter-increasing portion being disposed on a threaded portion side edge of said non-threaded portion, and
a non-threaded small diameter portion that is connected to said non-threaded diameter-increasing portion; and
a holder that is configured to hold said member in conjunction with said stud, said holder including:
a stud-receiving hole that is configured to receive said rod portion,
a first locking portion that has a nail portion configured to fit into said thread groove, and
a second locking portion that has a nail portion configured to engage with said non-threaded portion of said rod portion,
said first locking portion being elastically engaged with said threaded portion and said second locking portion being elastically engaged with said non-threaded portion when said rod portion is received in said stud-receiving hole,
said holder being configured so that:
said first locking portion is engaged with said threaded portion and said second locking portion is engaged with said non-threaded small diameter portion so that said stud and said holder are held in a first fixed position with said member, and
said first locking portion is engaged with said threaded portion and said second locking portion is engaged with said non-threaded diameter-increasing portion in a second position in which said holder is moved a predetermined amount in a direction away from said first fixed position.

2. A holder assembled with a stud, comprising:
said stud including a rod portion and a head integrally disposed on a base side of said rod portion,
said rod portion including:
a threaded portion that has a thread groove on an outer periphery surface of said threaded portion and a thread ridge, said threaded portion being disposed on a tip side of said rod portion, and
a non-threaded portion without said thread groove, said non-threaded portion being disposed on said base side of said rod portion, said non-threaded portion including:
a non-threaded diameter-increasing portion that has an outer diameter increasing toward said thread ridge, said non-threaded diameter-increasing portion being disposed on a threaded portion side edge of said non-threaded portion, and
a non-threaded small diameter portion that is connected to said non-threaded diameter-increasing portion, and said non-threaded small diameter portion being configured to hold a member in conjunction with said stud;
said holder including:
a stud-receiving hole that is configured to receive said rod portion;
a first locking portion that has a nail portion configured to fit into said thread groove; and
a second locking portion that has a nail portion configured to engage with said non-thread portion of said rod portion,
said first locking portion being elastically engaged with said threaded portion when said rod portion is received in said stud-receiving hole,
said holder being configured so that:

said first locking portion is engaged with said threaded portion and said second locking portion is engaged with said non-threaded small diameter portion so that said member is in a first fixed position with said stud and said holder, and said first locking portion is engaged with said threaded portion and said second locking portion is engaged with said non-threaded diameter-increasing portion in a second position in which said holder is moved a predetermined amount in a direction away from said first fixed position.

* * * * *